June 26, 1973  YO SATO  3,741,847
HAND LABELER

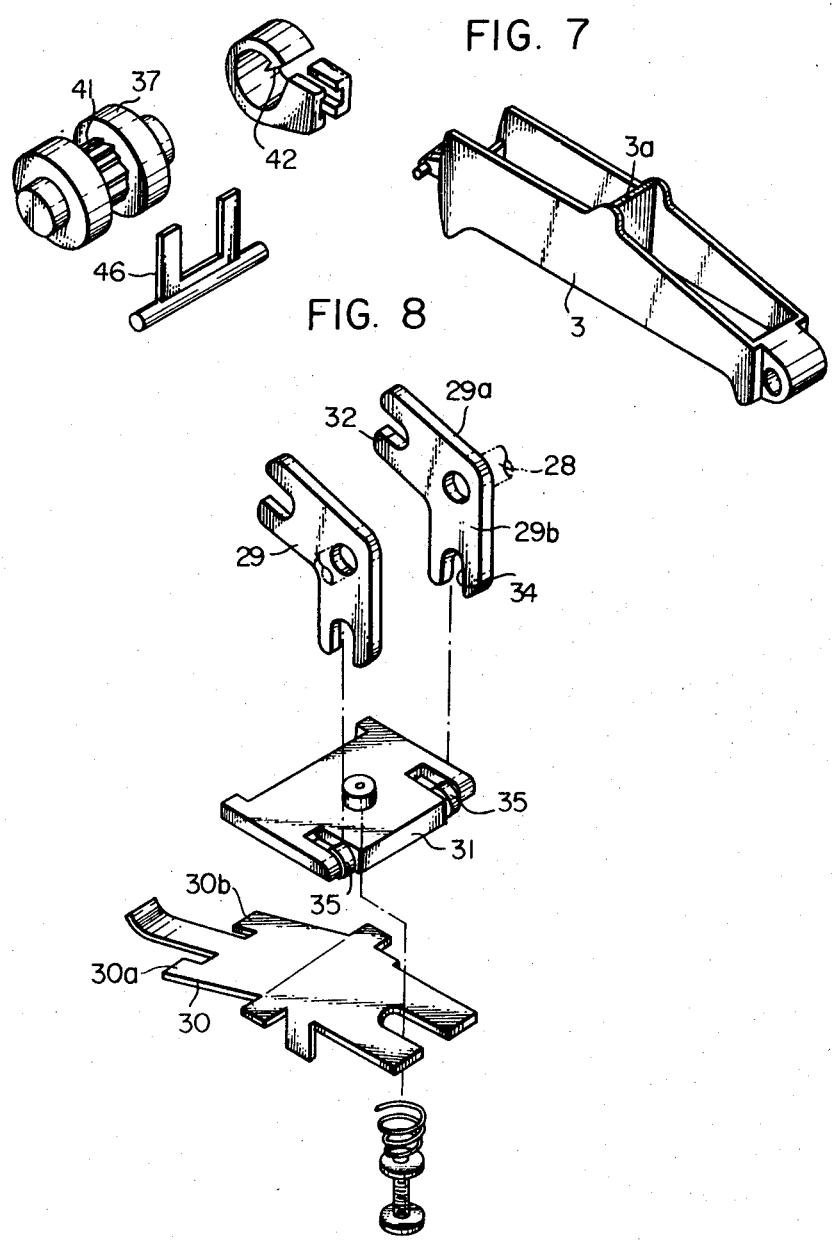

Filed Jan. 25, 1971  6 Sheets-Sheet 6

United States Patent Office 3,741,847
Patented June 26, 1973

3,741,847
HAND LABELER
Yo Sato, Tokyo-to, Japan, assignor to Kabushiki Kaisha Sato Kenkyujo, Tokyo-to, Japan
Filed Jan. 25, 1971, Ser. No. 109,519
Claims priority, application Japan, Jan. 31, 1970, 45/8,837
Int. Cl. B41l 19/00
U.S. Cl. 156—384   2 Claims

ABSTRACT OF THE DISCLOSURE

A hand labeler having a backing or base paper strip laminately supporting a label paper to constitute a label tape is sharply curved and doubled back near one end thereof away from the label paper and is provided with a specific slack in a narrow gap between opposed guides. When the end is pulled to take up the slack, the base paper is separated further from the label paper, and when the laminated combination of the label paper and the base paper strip is advanced as the end is held immovable, the base paper is separated still further from the label strip.

BACKGROUND OF THE INVENTION

This invention relates to apparatuses for printing, dispensing, and applying labels with adhesive on one surface thereof. More particularly, the invention relates to a new and advanced hand labeler operated by manually gripping and releasing actuation of a hand lever to accomplish the operations of feeding a continuous label strip or tape through a certain constant distance, that is, the length of one label, from a roll thereof, printing an inscription on the leading label, separating the label thus printed from a base material strip, and adhering the thus separated label to a commodity or some other article.

Known hand labelers of the class referred to above are, in most cases, of the type wherein a label tape comprising label paper and a base paper in laminated combination is passed through a narrow label guide mechanism, and, furthermore, the base paper is stretched around a complicated mechanism for drawing out the base paper, thus causing trouble in the operation of loading the labeler with a new roll of label tape.

Furthermore, the feeding of the label paper and the peeling off of the base paper therefrom are accomplished at a direction inverting corner part by pulling the base paper at its portion bent around the corner part. For this reason, the label tape tends to stick or rub at this corner part, thus requiring an inordinate force, whereby smoothness of the operations as described above cannot be attained. Consequently, the feeding of the label tape becomes irregular and gives rise to off-setting or misalignment of the printing on the labels. Moreover, the base paper itself tends to be damaged or ruptured.

SUMMARY OF THE INVENTION

It is an object of the present invention to overcome the above described difficulties in providing a new and improved hand labeler.

More specifically, it is an object of the invention to provide a hand labeler in which a label tape guide plate is automatically opened and closed by the opening and closing of a bottom cover, whereby the loading of a roll of the label tape is facilitated.

Another object of the invention is to provide a hand labeler in which the peeling off of the base material (e.g., paper) of the label tape is accomplished, not by bending the base material around a direction inversion corner part, but by forming a slack in the base material at a forward part thereof and pulling this slack part and by advancing the label tape in this state, whereby the label material and the base material are automatically separated without any appreciable resistance.

Still another object of the invention is to provide a hand labeler in which labels are positively fed one by one by feeding strokes of constant length of a feeding pawl, whereby offsetting or misalignment of printing is prevented.

According to the present invention in one aspect thereof, briefly summarized, there is provided a hand labeler for dispensing labels from one end of a label tape consisting of a continuous strip of a base material and labels adhering laminately on said base material and divided into contiguous unit labels of constant label length, which comprises, in combination, a hand lever operable by squeezing and releasing manipulation thereof. A printing device is coupled with the hand lever so as to be operated by the squeezing manipulation thereby to print on each of the unit labels. A label tape feeding device is coupled with the hand lever so as to be operated by only the releasing manipulation of the hand lever thereby to advance the label tape by about one half of each unit label. Guide members comprise a label slick and form at a dispensing end of the label a narrow gap therebetween into which the label tape is inserted and in which the base material is curved sharply in doubled-back state so as to extend rearward. A base material drawing device draws the base material rearwardly and is coupled with the hand lever so as to be operated by only the squeezing manipulation of the hand lever thereby to pull and separate the base material from the label tape at the sharply curved part thereof by a specific length corresponding to about one half of each unit label. A label sticking device for adherence of each unit label separated from the label tape and dispensed from the end of the label tape onto an article to be labelled.

The nature, features, and utility of the invention will be more clearly apparent from the following detailed description with respect to a preferred embodiment of the invention when read in conjunction with the accompanying drawings, in which like parts are designated by like reference numerals and characters.

BRIEF DESCRIPTION OF THE DRAWINGS

In the drawings:

FIG. 7 is an enlarged, exploded perspective view showing the essential parts of a roller mechanism which is used in the hand labeler shown in FIG. 1 to pull out the tape base material;

FIG. 8 is an enlarged, exploded perspective view showing essential parts related to the label tape feeding pawl in the hand labeler shown in FIG. 1;

For the sake of convenience and uniformity, directional terms such as "left," "front," and "upper" are herein used to indicate directions and parts of structures as follows. The front or forward end and the rear end of the hand labeler are, respectively, the left and right ends as viewed in FIGS. 1 and 3. The upper and lower parts are the upper and lower parts as viewed in these same figures. The left and right sides are, respectively, the near and far sides as viewed in these FIGS. 1 and 3, that is, the left and right sides of the labeler as viewed by an operator holding and using the labeler in the normal manner. The forward end or part of the label tape is the free or leading end or part thereof remote from the roll end.

DETAILED DESCRIPTION

Figure 1:
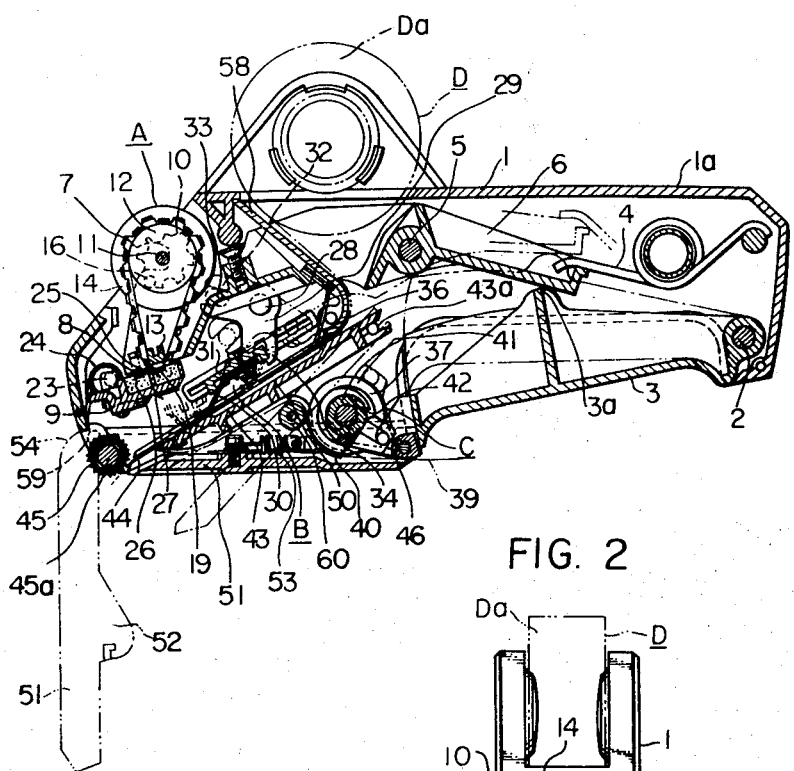
FIG. 1 is a side elevation view, in longitudinal section, showing an example of a hand labeler, in assembled state, according to the invention.

Referring to the drawings, particularly to FIG. 1, the hand labeler illustrated therein is of compact organization having a case frame 1 supporting various parts described hereinafter and serving as a case for most of these parts. This case frame 1 has a handle part 1a partly housing a hand lever 3 pivoted at its rear end on a pivot pin 2 supported at the rear lower end of the handle part 1a, thereby to make the hand lever 3 swingable upward or clockwise about pivot 2 relative to the handle part 1a when the handle part and hand lever are gripped and squeezed manually.

A projection 3a on the upper part of the hand lever 3 at approximately its midpoint is in contact with the rear end of a driving lever 6 pivoted at approximately its midpoint on a pivot pin 5 supported by the case frame 1. The rear end of the driving lever 6 is urged downward by a return spring 4 anchored to and supported by the handle part 1a.

The case frame 1 houses the greater part of a printing device A at the forward upper part thereof to the front of the driving lever 6, a label tape feeding device B in the forward central part of the case frame, and a base paper extracting device C in the lower part thereof. All of these devices are driven, as described in detail hereinafter, by driving movements of the driving lever 6, which in turn is driven by the upward movement of the hand lever 3 and the downward return action of the return spring 4 when the hand lever 3 is released.

Figure 9:
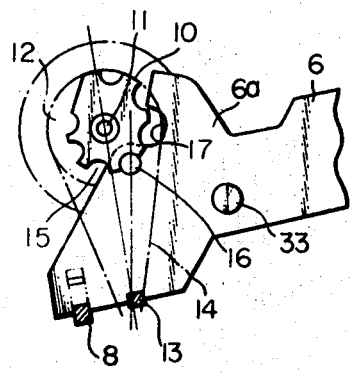
FIG. 9 is a fragmentary side elevation, with parts deleted, showing a mechanism for tensioning endless printing belts in the hand labeler shown in FIG. 1.
Figure 10:
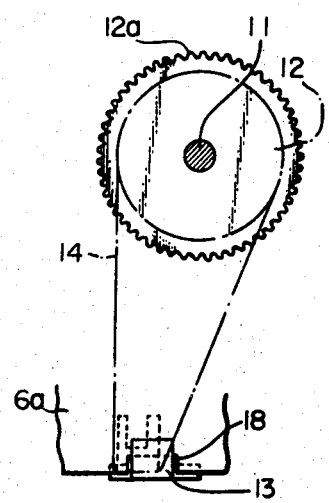
FIG. 10 is a fragmentary side elevation, with parts deleted, showing a mechanism for adjusting the positions of printing types in the hand labeler shown in FIG. 1.
Figure 11:
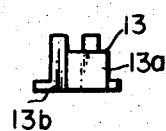
FIG. 11 is a side elevation of a member for receiving the printing belts in the hand labeler shown in FIG. 1.
Figure 12:
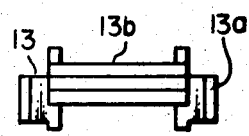
FIG. 12 is a top plan view of the member shown in FIG. 11.
Figure 13:
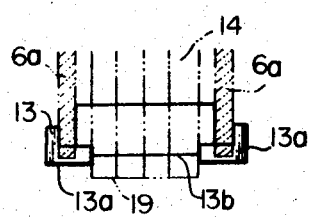
FIG. 13 is a front elevation of the same member.
Figure 14:
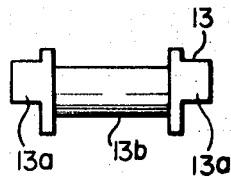
FIG. 14 is a bottom view of the same member as that shown in FIG. 11.
Figure 15:
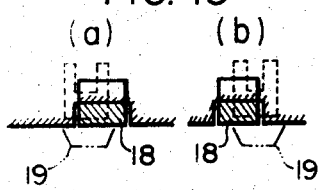
FIGS. 15(a) and 15(b) are elevations indicating variation of position of the member for receiving the printing belts accompanying adjustment of positions of printing types.
Figure 16:
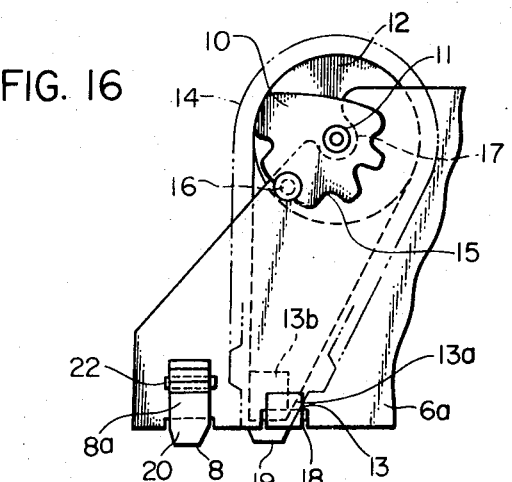
FIG. 16 is a side elevation showing the arrangement of printing types in a printing mechanism of the labeler.
Figure 17:
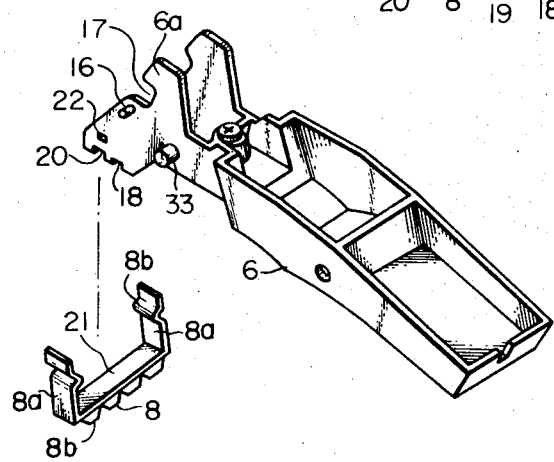
FIG. 17 is an exploded perspective view showing an actuating lever serving additionally as a support frame for the printing mechanism and a fixed type member shown in enlargement.
Figure 18:
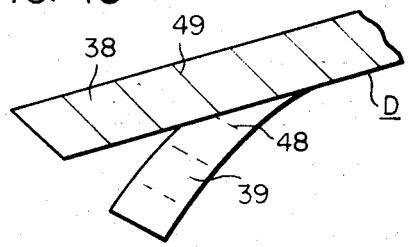
FIG. 18 is a fragmentary perspective view showing a part of the label tape comprising label units contiguously aligned in a row.

The printing device A comprises essentially a printer 7 detachably mounted on a support frame part 6a for supporting a printing mechanism, the frame part 6a being formed on the front end of the driving lever 6, interchangeable fixed types 8, and an ink reservoir 9. The printer 7 has a plurality of independent, parallel endless printing belts 14 stretched around corresponding sheaves 12 freely rotatable around a transverse shaft 11 the ends of which are provided with cams 10 for adjusting the tension of the printing belts 14 as shown in FIG. 9 and a printing belt receiving member 13 fitted transversely in cutout notches 18—18 in the bottom edges of the support frame 6a.

Each cam 10 is of eccentric type and has on its periphery several cam concavities 15 at progressively varying, eccentric positions from the cam rotational center. These cam concavities 15 of each cam 10 are engageable with a stud pin 16 fixed to the support frame part 6a of the driving lever 6. Accordingly, the distance between the shaft 11 and the pin 16, and therefore the distance between the shaft 11 and the printing belt receiving member 13 can be varied by suitably selecting the concavity 15 to engage with the pin 16 thereby to adjust optimally the tension in the printing belt 14.

The printing belt receiving member 13 has, at two ends thereof, support ends 13a engaged with the cutout notches 18 in the lower edges of the support frame 6a and has a middle part formed as a belt guide part 13b. The belt guide part 13b is offset in the front-to-rear direction by a specific distance relative to the support ends 13a. Accordingly, by changing the front and rear orientation of the member 13 when it is being mounted on the support frame 6a, the position relative to the support frame 6a of printing types 19 on the printing belts 14 supported and positioned by the belt guide part 13b can be variably selected to be at either of two positions.

The inscription printed by the types 19 on each printing belt 14 can be changed by moving the belt by means of a turning wheel 12a having serrations on its periphery and fixed to the corresponding sheave 12. In addition, fixed types 8 for printing names of shops, names of commodities, advertising words, symbols, and other inscriptions can be fitted into cutout notches 20 formed in the lower edge parts of the support frame 6a near the front end thereof.

Each group of these types 8 is formed integrally with a fixed type base 21 which is fitted into the notches 20 and held by the engagement of click projections 8b formed on the inner sides of riser flanges 8a rising perpendicularly from the left and right ends of the base 21 with rectangular holes 22 formed in the support frame 6a. Thus, the fixed types 8 can be detachably and interchangeably mounted.

The ink reservoir 9, which is pivoted about pins 23 supported on the case frame 1 and is urged in a return direction (counter-clockwise direction as viewed in FIG. 1) by a spring 24, contains ink pads 25 and 26 for supplying ink to the afore-described types 19 at the lower part of the printer 7 in its raised position to the fixed types 8 when the ink reservoir is in its inoperative position of rest or returned position. While the ink pads 25 and 26 may be impregnated with the same inks, it is desirable in most cases that they be impregnated with inks of different color, and for this purpose, a partition wall 27 is provided therebetween to separate the two inks.

The label tape feeding device B, which operates to feed a continuous label tape D stored in a roll Da to the printing device A, has a pair of bellcranks 29 rockably supported on a transverse shaft fixed to the case frame 1, a feed pawl 30, and a support plate 31 for supporting the feed pawl 30. The distal ends of the arms 29a and 29b of each bellcrank 29 are provided with yokes 32 and 34, respectively. Each upper yoke 32 is engaged with a stud pin 33 extending laterally from one side of the driving lever 6, while the lower yoke 34 is engaged with a pivotal part 35 on the rear edge of the support plate 31.

The support plate 31 is slidable in advancing and retracting motions, the lateral edges thereof being slidably engaged in guide grooves 36 formed in the side walls of the case frame 1. The guide grooves 36 are parallel to the feed path of the continuous label tape D. The front end of the feed pawl 30 constitutes its working end and is provided with left and right pawl teeth 30a and 30b for engaging with incisions in the label tape D described hereinafter.

The base paper extracting device C has, as an essential member, a spool-shaped roll 37 made of a substance of high frictional resistance such as rubber. The distal end of a leaf spring 40 for sliding contact with the base paper 39 after separation of the labels 38 presses elastically against the lower surface of the roll 37. The base paper 39 is passed between the roll 37 and spring 40 and discharged out of the case frame 1 by the action of the roll 37 as described below.

A ratchet wheel 41 is formed at the middle part of the roll 37 coaxially therewith and has teeth engageable by a ratchet pawl 42 connected to the distal or free end of the hand lever 3. When the hand lever 3 is squeezed by hand, the pawl 42 thus actuated causes rotation of the ratchet wheel 41 and therefore rotation of the roll 37 in the direction (counterclockwise as viewed in FIG. 1) for discharging the base paper. When the hand lever 3 is released, the pawl 42 slides over the teeth of the ratchet wheel 41, and reverse rotation of the roll 37 is prevented by a spring 46.

Figure 4:
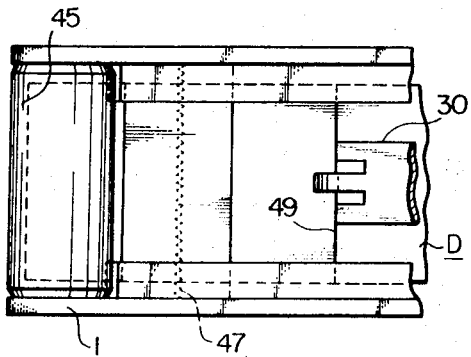
FIG. 4 is a fragmentary view taken in the direction of arrow IV in FIG. 3.
Figure 5:
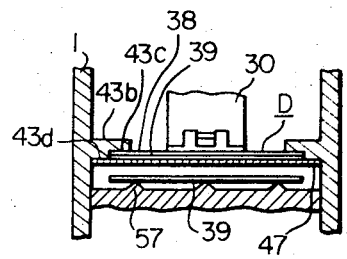
FIG. 5 is a sectional view taken along the plane indicated by line V—V in FIG. 3, as viewed in the arrow direction indicated.
Figure 6:
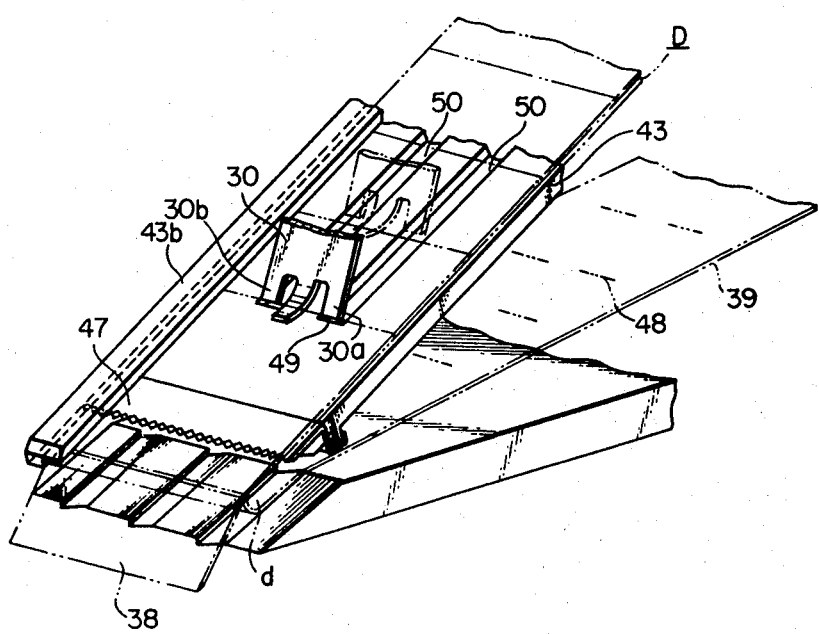
FIG. 6 is an enlarged perspective view, with parts cut away and parts deleted, showing a part of the label feeding and dispensing mechanism shown in FIG. 1.

For guiding the label tape as it is fed and printed, there is provided a label slide 43 pivoted at its rear end on transverse pins 43a supported by the case frame 1. The two lateral edges of this label slide 43 are in contact with the lower surfaces 43d of left and right flanges 43b projecting inward from the case frame 1 as shown in FIGS. 4 and 5. The flanges 43b are provided with respective stepped parts 43c, and the lateral edges of the label tape D are guided between these stepped parts 43c and the label slide 43.

A front end of the label slide 43, a label discharge aperture 44 is formed in the case frame 1. In this aperture 44 there is provided a pressing member 45 adapted to stick the label and supported on a transverse pin 45a. This pressing member may be of any suitable form such as a roller or one or more boat-shaped shoes.

A bottom cover 51 for covering the open bottom part of the case frame 1 is pivoted at its front end on pins 59. The bottom cover 51 is provided on its lateral edges at its middle part with two upwardly projecting bracket flanges 52, which contact and push upward the lower surface of the label slide 43 when the bottom cover 51 is closed to press the label slide 43 against the lower surfaces 43d of the flanges 43b and thereby to hold positively the label slide in its normal operational position. When the bottom cover 51 is opened, the label slide 43 drops under its own weight while rotating counterclockwise about the pin 43a thereby to form a wide opening at its front end.

The bottom cover 51 is held in its closed position by a lock mechanism 53. At the front end of the bottom cover, that is, in the vicinity of its pivotal part, there is formed an opening 54 coinciding with the label discharge aperture 44 of the case frame 1. This opening 54 has a substantially flat bottom surface 55 which is substantially parallel to the label slide 43 when the bottom cover 51 is closed, and the gap of guide grooves 56 formed between this surface 55 and the aforementioned flanges 43b is made narrow. The bottom surface 55 is provided with three parallel ridges 57 extending front-to-rear thereby to prevent labels which have been separated from the base paper from adhering to the surface 55. An idler guide roller 60 is provided between the aforementioned bracket flanges 52 of the bottom cover 51 and functions to guide separated base paper 39 to the roll 37.

The label slide 43 is provided at its front end with a serrated edge plate 47 fixed thereto and serving to prevent excessive drawing out of the base paper 39 by the roll 37. That is, when the base paper 39 loses slack d inside of the discharge aperture 44, the teeth of the serrated edge plate 47 bite into the base paper 39 thereby to prevent it from being drawn out further.

The continuous label tape D comprises the bases paper 39 in the form of a continuous tape and a label paper also in the form of a continuous tape, the label paper is superposed and laminated onto which it adheres the base paper to form the label tape D of integral structure as wound on the roll Da. The label paper is provided at constant intervals therealong with intermittent transverse incisions 49 dividing the label paper into unit labels 38. The incisions at each label division are in the form of two transverse slits in alignment superposed directly over like slits 48 formed in the base paper 39.

The aforementioned pawl teeth 30a and 30b of the feed pawl 30 engage with each pair of slits 48 of the base paper 39, through the corresponding slits 49 of the overlying label paper, thereby to advance the label tape D longitudinally through a distance equal to the dimension of a label unit in the tape longitudinal direction each time the label tape feeding device B operates through one operational cycle. The label tape D is unrolled from the roll Da and moved to the label tape feeding device B as it is guided by a label tape guide plate 58 supported by the case frame 1 between the front part of the roll Da and the label slide 43.

The hand labeler of the above described organization is loaded with a label tape and operates in the following manner.

Figure 2:
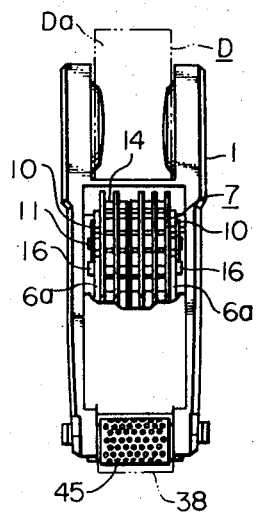
FIG. 2 is a front elevation view, with a part cut away, of the hand labeler shown in FIG. 1.

The roll Da of the label tape D is slipped into loaded position as shown in FIGS. 1 and 2 so as to unwind in the counterclockwise direction as viewed in FIG. 1. The bottom cover 51 is opened, and the label slide 43, which has been held thereby in its upper position, is thereby released and permitted to pivot about pins 43a to cause its front end to be fully opened. The free end of the label tape D is pushed to slide downward along the upper face of the guide plate 58 and then lead to and inserted into the gap between the lower end of the guide plate 58 and the upper surface of the label slide 43.

The lateral edges of the free end of the label tape D are then further inserted into the spaces below the flanges 43b and moved therealong until the free end of the label tape projects from the front end of the label slide 43. The free end of only the base paper 39 is then curved sharply downwardly and rearwardly and directed toward the upper part of the guide roller 60. The free end of the base paper is further passed between the roller 60 and roll 37 and discharged through the opening at the bottom of the case frame 1.

The above described label type loading procedure can be carried out in a simple and easy manner since the bottom cover 51 is open, and, moreover, the label slide 43 is opened widely.

Figure 3:
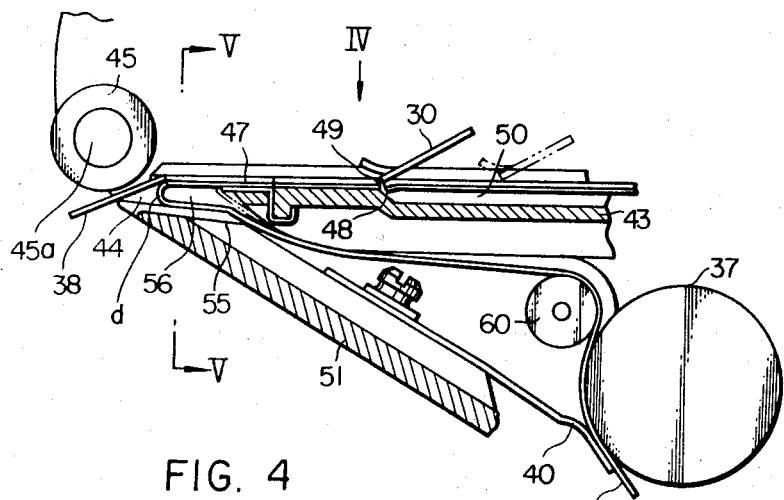
FIG. 3 is an enlarged, fragmentary side elevation view, in longitudinal section, showing the label feeding and dispensing mechanism of the hand labeler shown in FIG. 1.

Next, when the bottom cover 51 is closed, the bracket flanges of the cover 52 push the label slide 43 upward and cause the lateral edges thereof to contact with and to be held against the lower surfaces 43d of the flanges 43b, whereby the label slide 43 is held in its normal operational position. At the same time, the roller 60 lifts the base paper 39, and the leaf spring 40 presses the base paper against the roll 37 thereby to impart a wrapping action thereto and increasing the area of firm contact for effective traction between the roll 37 and the base paper 39. When the bottom cover 51 is thus closed, the lock mechanism 53 snaps shut to secure the cover. Thus, the base paper 39 is in a sharply curved doubled-back state with a slack d in a narrow gap between the guide grooves 56 as shown in FIG. 3. This important feature of this invention participates in facilitating separation of the base paper from the label paper.

When the bottom cover 51 is closed in the above described manner, the lock mechanism 53 snaps shut to secure the cover automatically to the case frame 1. The hand labeler is now ready for operation.

When the hand lever 3 is squeezed toward the handle part 1a, the projection 3a pushes the rear arm of the driving lever 6 upward, counter to the force of the spring 4, whereby the printer 7 of the printing device A mounted on the front end of the driving lever 6 is lowered. The printer 7 thereby pushes the ink reservoir 9 and prints an inscription on a label 38 resting on the label slide 43.

At the same time, the above described movement of the driving lever 6 causes the bellcranks 29 engaged at their upper arms with pins 33 fixed to this lever 6 to rotate in the counterclockwise direction about their pivot pin 28. Consequently, the yokes 34 of the bellcranks 29 cause the feeding pawl engaged therewith to retract rearward along the upper surface of the label tape.

Furthermore, the above described movement of the hand lever 3 causes the ratchet pawl 42 connected to the front or free end thereof to rotate in the direction of engagement with the ratchet wheel 41. Accordingly, the roll 37 of the base paper extracting device is rotated in the counterclockwise direction as viewed in FIGS. 1 and 3, whereby the slack d in the base paper 39 is drawn out rearward.

Then, when the grip on the hand lever 3 is relaxed, and the lever is released, the hand lever is returned downwardly by the force of the spring 4 acting on the rear end of the driving lever 6, whereby the front end of the driving lever 6 rises. Consequently, the printer 7 also rises and returns to its original position, and, at the same time, the bellcranks 29 rotate in the clockwise direction (as viewed in FIG. 1) thereby to cause the feed pawl 30 to advance forward. The pawl teeth 30a and 30b of the feed pawl 30 thereupon penetrate into the first pair of slits 48 of the base paper 39 through the corresponding slits 49 of the label paper thereabove as indicated in FIG. 3. Consequently, the base paper also advances forward, and its curved inversion part assumes the forward position, that is, the position indicated in FIG. 3, in which the slack d is formed.

During this operation, the movement of the hand lever 3 causes the remaining half of one label unit, the front half of which, approximately, has already been separated from the base paper 39, to be dispensed forward through the label discharge aperture 44 as it is peeled off the base paper and to assume the state of the label 38 in FIG. 3. Then, as the hand labeler is manipulated to stick a label on an article, this label 38 is pressed against and stuck to the article (not shown) by the label pressing member 45.

The aforementioned slack d of the base paper is drawn outwardly as it is separated from the label paper, by the succeeding squeezing manipulation. The above described single cycle of operation is repeated each time the squeezing manipulation is carried out.

Thus, in the hand labeler according to this invention, squeezing of a hand lever causes a label tape feed pawl to retract, a printing mechanism to descend to a label surface to print an inscription thereon, and the base paper of the label tape to be drawn to take up a specific slack produced in the preceding operational cycle in the base paper and thereby to peel and separate the base paper from the label, and releasing of the hand lever causes the printing mechanism to rise and the feed pawl to advance thereby to feed the label tape by a specific constant length and to produce the slack in the base paper.

Accordingly, a feature of this invention is that the label printing and label feeding operations are positive and accurate. At the same time, since the base paper and labels are separated, not at the front end of the label slide as heretofore, but in a position and state of least resistance, the base paper is not subjected to excessive stress and breakage, and the movements of the label tape and base paper are very smooth. Furthermore, abnormal disposal of the base paper such as excessive or deficient drawing out of the base paper is prevented.

Another feature of the hand labeler according to this invention is that it can be loaded with a roll of the continuous label tape in a simple and easy manner since the necessary actions, such as releasing and holding of the label slide 43 and the drawing out of the base paper 39 and pressing of the same against the extraction roll 37, are all accomplished by the mere single-action opening and closing of the bottom cover 51 with a one hand.

What is claimed is:

1. A hand labeler for dispensing labels from one end of a label tape consisting of a continuous strip of a base material and labels laminated on said base material and divided into contiguous unit labels of similar label length which comprises, in combination, a hand lever operable by a squeezing manual manipulation and releasing thereof, a printing device having means coupled with said hand lever operated by said squeezing manual manipulation to print on each of said unit labels, a label tape feeding device having means coupled with said hand lever operated only upon said releasing manipulation of the hand lever thereby to advance the label tape longitudinally about one half length of each unit label, guide members comprising a label slide defining at a dispensing end of the labeler a narrow gap into which said label tape is inserted and means in which the base material is doubled-back sharply bent so as to define a slack loop and extend rearwardly of the direction of advance of said label tape, a base material drawing device having means to draw the base material rearwardly and coupled with said hand lever for operation by only the squeezing manual manipulation of the hand lever thereby to pull and separate the base material by a specific length from the label tape at the sharply bent part thereof, said specific length corresponding to about one half of each unit label, a label sticking device having means for adhering the individual unit labels separated from the label tape and dispensed from the end of the label tape onto an article to be labelled, and said label slide comprising a plate having serrations along an edge adjacent which said base material defines said slack loop for engaging said base material in the event said slack loop is excessively withdrawn rearwardly whereby said base material is drawn rearwardly in controlled lengths.

2. A hand labeler for dispensing labels from one end of a label tape according to claim 1, including means pivotally mounting said label slide at an end removed from said edge having said serrations, a case on said labeler having a pivotally mounted cover for pivotal movement, means on said cover for pivoting said label slide to open said gap for readily inserting a label tape therethrough, and said cover restoring said label slide to a position defining said narrow gap when said cover is closed.

References Cited

UNITED STATES PATENTS

| | | | |
|---|---|---|---|
| 3,403,066 | 9/1968 | Ikelheimer | 156—577 |
| 3,231,446 | 1/1966 | Satas | 156—384 |
| 3,619,324 | 11/1971 | Sato et al. | 156—384 X |

ALFRED L. LEAVITT, Primary Examiner

C. WESTON, Assistant Examiner

U.S. Cl. X.R.

156—541, 584